United States Patent [19]

Dettwiler

[11] Patent Number: 5,074,253
[45] Date of Patent: Dec. 24, 1991

[54] VOLUMETRIC DISPLACEMENT MACHINE WITH DOUBLE-ACTION OSCILLATING PISTONS

[76] Inventor: Georges Dettwiler, 12,405 Jasmin St., Cartierville, Canada, H4K 1W1

[21] Appl. No.: 479,994

[22] Filed: Feb. 14, 1990

[51] Int. Cl.[5] .................... F02B 53/00; F02M 57/06
[52] U.S. Cl. ............................. 123/18 A; 123/18 R; 123/297
[58] Field of Search ............... 123/18 R, 18 A, 297; 137/524

[56] References Cited

U.S. PATENT DOCUMENTS

| | | | |
|---|---|---|---|
| 1,387,991 | 8/1921 | Kunke et al. | 137/524 |
| 2,993,486 | 7/1961 | Bready | 123/297 |
| 3,299,867 | 1/1967 | Ficsur et al. | 123/18 R |
| 4,599,976 | 7/1986 | Meuret | 123/18 R |

Primary Examiner—Richard A. Bertsch
Assistant Examiner—Alfred Basichas
Attorney, Agent, or Firm—Pierre Lespérance

[57] ABSTRACT

The motor comprises a casing defining a circular cavity in which a rotor is rotatably mounted. The rotor is keyed to a hollow shaft issuing from the casing. A pair of angularly-spaced radial partitions are fixed to the casing, extend across the cavity and are in sealing engagement with the rotor. The partitions define a compressor chamber and a work chamber. A hollow compressor piston and a work piston are fixed to the rotor at angularly-spaced locations and extend within and are in sweeping engagement with the compressor and work chambers, respectively. The compressor piston communicates with atmospheric air through the hollow of the shaft. A pair of valved air inlet ports open in the compressor chamber adjacent to respective partitions for adjusting the amount of air entering the latter chamber. An outlet port opens in the work chamber intermediate the partitions.

5 Claims, 7 Drawing Sheets

VOLUMETRIC DISPLACEMENT MACHINE WITH DOUBLE-ACTION OSCILLATING PISTONS

FIELD OF THE INVENTION

The present invention relates to a volumetric displacement machine with oscillating pistons and, used as an air compressor but mainly as an internal combustion engine.

BACKGROUND OF THE INVENTION

In a conventional internal combustion piston type engine, when the explosion occurs in a cylinder, the piston is at or near its top dead-center position and, therefore, the torque exerted on the crank shaft is at a minimum when the explosion force is at a maximum. Therefore, the efficiency of such engine is rather poor. Also, in conventional two-cycle engines, the sweeping-away of the burned gases, after the detent, is inefficient, and this results also in poor efficiency.

OBJECTS OF THE INVENTION

It is the general object of the present invention to provide an internal combustion engine in which the torque arm exerted by the explosion force is at a maximum and constant during the entire detent of the working piston.

Another object of the present invention is the provision of an engine of the character described, in which complete sweeping of the combustion gases is effected at the completion to each power stroke.

Another object of the present invention is the provision of a two-cycle engine of the character described, in which the same unit combines an air compressor portion and a work-producing portion, and has compressed air transfer means for transferring the air compressed in the first-named portion to the work portion to effect sweeping of the burnt gases in the work portion at the end of the detent stroke.

Another object of the present invention is to provide an engine of the character described, in which a rotor is caused to oscillate in rotation with the air compression and the explosion cycle being effected alternately on opposite faces of a compressor piston and of a work piston respectively.

Another object of the invention is to provide an engine of the character described, which is easy to start in a forward or in a reverse direction, and which can be stopped in a smooth manner.

Another object of the invention is to provide an engine of the character described, which can be made to have a high compression ratio, so as to be used as a diesel engine and using any type of fuel.

Another object of the invention is to provide a machine of the character described, which is used as an air compressor.

Another object of the invention is to provide a very simple and efficient motion converter, so as to convert the reciprocating or alternating movement of the output shaft of the engine to a continuous rotation.

SUMMARY OF THE INVENTION

The volumetric displacement machine of the invention comprises a casing defining a circular cavity, a rotor rotatably mounted in the casing extending across and co-axial with the cavity, a pair of angularly-spaced radial partitions fixed to said casing, extending across Said cavity and in sealing engagement with said rotor, said partitions defining in said cavity a compressor chamber and a work chamber, a compressor piston and a work piston fixed to and radially protruding from said rotor at angularly-spaced locations and extending across and in sweeping engagement with the compressor chamber and with the work chamber, respectively. The pistons are oscillatable in their respective chambers between a left-hand and a right-hand dead position. Valved air inlet ports open in said compressor chamber. An outlet port opens into the work chamber intermediate the partitions. The rotor has an air transfer passage on each side of the compressor piston, each passage establishing communication between the compressor chamber and the power chamber around an adjacent partition when the compressor piston reaches a dead position at said last-named partition. Preferably, each piston has opposite radial faces which make an angle with each other, the angle between the radial faces of the work piston being larger than the angle between the radial faces of the compressor piston, the compressor piston being centered relative to the work piston, the angular extent of the work chamber being greater than the angular extent of the compressor chamber. Preferably, the valves of the valved air inlet ports are spring biased to closed position and automatically open to admit air into the compressor chamber upon the compressor piston creating a vacuum in the compressor chamber. Preferably, the value of the spring bias is adjustable. When ,used as an engine, there are provided fuel injection means and fuel igniting means at each partition and oriented towards the work chamber. Preferably, the fuel-injecting means include a needle valve fed with pressurized fuel, located in the partition and opening within a pre-combustion chamber, also located in said partition, the chamber opening into the work chamber. The needle valve is remotely controlled between fully-closed and fully-open position. The igniting means include a glow plug located at the nozzle of the needle valve within the pre-combustion chamber.

Preferably, means are also provided to restrict the discharge of the exhaust gases when it is desired to stop the engine, thus providing a brake to progressively slow down the oscillating movement of the rotor assembly. The compressed gases discharged from the engine during its stopping are preferably stored in a reservoir and used for starting the engine through a suitable tubing arrangement. A butterfly valve controls the rate of air admission to the engine. With slight modifications, the engine can be used as an air compressor. Different embodiments of compressor air inlet ports are shown and described.

DETAILED DESCRIPTION OF THE PREFERRED EMBODIMENT

Figure 1:
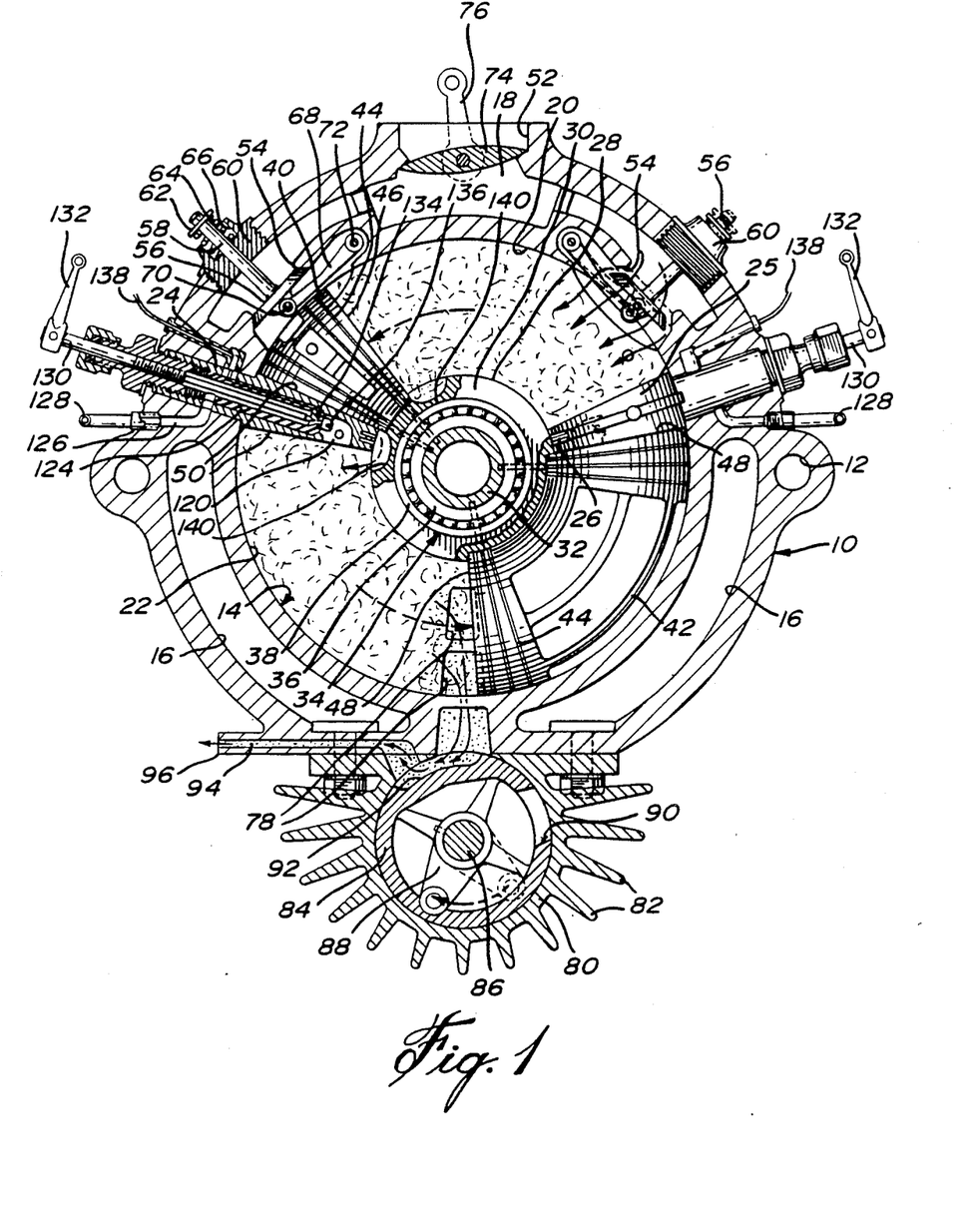
FIG. 1 is a cross-section of the engine unit showing both the compressor piston and work piston in their anti-clockwise dead position.
Figure 2:
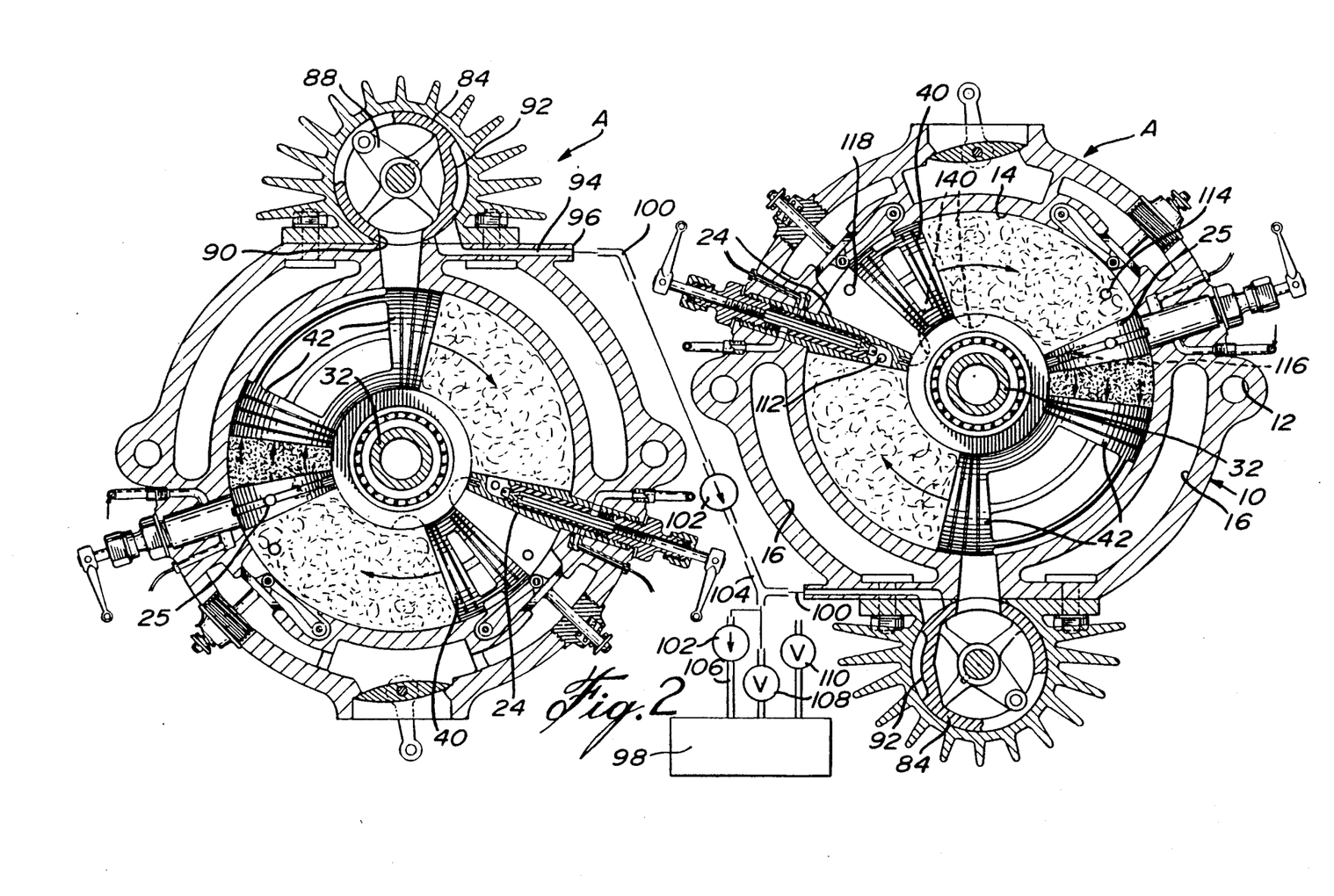
FIG. 2 shows in cross-section an arrangement of two engine units which, for the purpose of explanations, are disposed side by side but which, in reality, should be in co-axial arrangement with one unit oriented at 180 degrees with respect to the other unit, these cross-sections also showing that the rotor has started clockwise rotation with respect to the position shown in FIG. 1.

Referring to FIG. 1 and to the right-hand side of FIG. 2, there is shown one-half of a casing 10. The two halves, when joined together for instance by means of through bolts and nuts, shown at 11 in FIG. 10, extending through holes 12, form a completely-enclosed circular cavity 14, of generally toroidal shape. The casing is of double wall construction, defining cooling chambers 16 for the circulation of a cooling fluid, which can be at least in part the air sucked in by the engine. The casing also defines an air intake chamber 18 diametrically opposite the two cooling chambers 16. The cavity 14 is divided into a compressor chamber 20 and a work chamber 22 by a pair of partitions 24, 25 which are secured to the casing 10 and extend across the cavity 14 transversely thereof and which, at their radially-inner edge, are provided with sealing segments 26 in sealing and slidable contact with the cylindrical surface 28 of a rotor 30, which is keyed to a tubular shaft 32 which extends across cavity 14, is co-axial therewith and is rotatably supported in the casing 10 by two ball bearings 34, the inner race 36 of which fits around the shaft 32 and the outer race 38 of which fits within a central bore of each half of casing 10.

Thus, the two chambers 20 and 22 are completely sealed from each other.

A compressor piston 40 and a work piston, 42 are rigidly fixed to the periphery of the rotor 30 and projects radially outwardly therefrom within the compressor chamber 20 and the work chamber 22, respectively. Each piston 40, 42 is provided with sealing segments 44 in sliding and sealing contact with the surface of the chambers 20 and 22. Each piston 40, 42 has a partially-circular cross-section to fit the toroidal shape of the chambers 20, 22. Compressor piston 40 has two exposed end flat faces 46 which are radial with respect to the output shaft axis and which, therefore, make an angle between themselves. Similarly, the flat end faces 48 of the work piston 42 make an angle between themselves and are radial with respect to the output shaft axis. The compressor piston 40 preferably extends between 15 and 28 degrees, while the work piston 42 extends between 85 and 95 degrees.

The rotor and piston assembly is designed to oscillate through a stroke of between 100 and 130 degrees between their anti-clockwise dead position and their clockwise dead position. In these positions, the end faces 46 and 48 of the compressor piston 40 and of the work piston 42 are designed to come very close to or in actual contact with the adjacent flat radial faces 50 of the partitions 24, as shown in FIG. 1:

To reduce inertia, each piston 40, 42 is hollowed out, except for its ends.

The casing 10 is provided with a casing air inlet 52, which is centrally located with respect to the two partitions 24. The air inlet 52 admits air to the air intake chamber, 18 and the inner wall of the latter forms two angularly-spaced air intake ports 54, which open within the compressor chamber 20 adjacent each partition 24, 25 and which are symmetrical with respect to said partition.

A spring-biased valve is mounted in each port 54. More particularly, each valve includes a valve disc 56 fixed to and surrounding a stem 58 which slidably fits within a central bore of a guide plug 60, which is externally threaded to be adjustably screwed within a bore of the outer wall of the casing. The valve stem 58 extends outwardly of the plug 60 and is provided with a retaining security washer 62 at its outer end. A compression spring 64 surrounds the outer portion of stem 58 and abuts against the washer 62 and against the bottom of a cavity 66 made in the plug 68.

Spring 64 biases the valve disc 56 radially outwardly to seat against the outwardly-tapered valve seat formed by the port 54. To guide the valve in its closing and opening movement, a guiding lever 68 is pivoted at 70 to the valve stem 58 radially inwardly of the valve disc and is pivoted at 72 to the casing 10. The two valve discs or heads 56 are designed to operate automatically under the differential air pressure on both sides of the valve disc 56. In other words, the two valves are closed by the coil springs 64 when the air pressure within the portion of the compressor chamber to which the valve is exposed is at about atmospheric pressure, and the valve opens when the pressure in said compressor chamber portion is at a predetermined value below atmospheric pressure.

A butterfly valve 74, which can be remotely operated by its lever 76, is mounted across the casing air inlet 52 for regulating the amount of air supplied to the casing 10.

Outlet ports 78 are arranged on each side of the cavity 14 in a zone generally diametrically opposite to the casing air inlet 52. The outlet ports 78 are thus centered with respect to the work chamber 22. The outlet ports 78 are normally closed by the work piston 42, except when the latter reaches either one of its dead positions, as clearly shown in FIG. 1. The outer ports 78 are in communication with an exhaust pipe 80, of cylindrical internal shape, and provided with heat-radiating external fins 82.

A rotary valve 84, forming a hollow cylindrical body, is in slidable contact with the internal surface of the exhaust tube 80, being mounted on a shaft 86 operable by a remotely-controlled operating lever 88. Valve body 84 has a through opening 90, which, when the valve 84 is rotated in a first position so as to bring opening 90 in register with the exhaust ports 78, (FIG. 2) allows direct discharge of the combustion gases to the atmosphere through exhaust tube 80 at the end thereof opposite its other closed end through which shaft 86 issues with lever 88 on the outside.

Rotary valve 84 is also provided with an external depression 92 at its outer surface, which is angularly spaced from opening 90 and which comes at one end in register with the outlet ports 78 in another rotated position of the rotary valve 84. (FIG. 1) The depression 92 then establishes communication between the outlet ports 78 and a narrow restricted passage 94 opening outwardly of the casing and forming an outer nipple 96, which, as shown in FIG. 2, is connected to an air reservoir 98 by an air line 100, provided with a check valve 102. In FIG. 2, the two restricted passages 94 are connected each by their air line 100 to a Y-connection 104. The left-hand engine unit is provided with a check valve 102, while a second check valve 102 is common to the two units, together with a common air line 106 going to the reservoir 98.

When the rotary valve 84 is in the position of FIG. 1, the air discharged from the two units, the fuel injectors being turned off, can be accumulated in the reservoir 98. This reservoir can be discharged through either valve 108 or 110 when open. Valve 108 is connected by air lines, not shown, to two air outlets 112 and 114, while valve 108 is connected to two air outlets 116 and 118 for each unit. Outlet 112 is located in a pre-combustion chamber 120 formed at the radially inner end of the partition 24 and opening within the combustion or work chamber 22. Similarly, outlet 116 is located in the pre-combustion chamber 120 of partition 24.

Outlets 114 and 118 are located within the compression chamber adjacent the respective partitions 25 and 24. The purpose of the narrow passages 24, air reservoir 98 and the piping network just described will be described hereinafter.

When used as an engine, each unit is provided with fuel injection means and fuel igniting means. The fuel injection means include a needle valve body 124 located within each partition 24 and supplied with liquid fuel under pressure by the casing passage 126 and tubing 128. The needle valve itself includes a rod with a pointed end, indicated at 130, screwed within the valve body 124 and remotely operated by means of a lever 132 fixed to the outer end of the rod 130. The needle body 124 has a narrow outlet nozzle or injector 134 opening directly within the pre-combustion chamber 120. The fuel igniting means includes a glow plug 136 located within the pre-combustion chamber 120 in register with nozzle 134 and supplied with electricity through an electric wire 138.

The outer cylindrical surface 28 of the rotor 30 is provided with a notch 140 adjacent to and on each side of the compressor piston 40, as shown in FIG. 1. These notches 140 serve as transfer passages for the compressed air around the partition 24 or 25 when the rotor reaches a dead position at the end of its stroke.

The engine operates as follows. Rotary valve 84 is in the position of FIG. 2. Referring to FIG. 1, a charge of compressed air is located between the right-hand partition 25 and the work piston 42, while the compressor piston 40 has just compressed a charge of fresh air and transferred the same through notch 140 and around partition 24 into the compressor chamber portion 20 at the left of work piston 42, so, as to completely sweep away the combustion gases in the latter compressor chamber portion, the combustion gases being discharged through the outlet port 78. The injector needle valves 124, 130 are opened in both partitions 24,25. properly-timed fuel injection is effected in the proper amount of fuel into the pre-combustion chamber 120 of the right-hand partition 25 and the fuel is ignited by the adjacent glow plug 136. Explosion takes place and the work piston 42 rotates in clockwise direction, and so is. the compressor piston 40. The outlet ports 78 are closed by the work piston 42 and the fresh air ahead of the work piston is compressed until the work piston reaches its clockwise dead position. During this time, the air atmospheric pressure ahead of the compressor piston 40 is compressed by the latter, and then discharged through notch 140 around the right-hand partition 25 into the right-hand portion of the compressor chamber 20 to sweep away the combustion gases. The process is repeated when the rotor moves in anticlockwise direction.

It should be noted that the compressor piston and the work piston effect a working stroke in each of the two directions of rotation. A high compression ratio can be achieved; the rotor slows down at the end of its stroke due to the braking effect exerted by the gas being compressed between the piston and the partition ahead of it. The effect of the compressor part of the engine unit is to thoroughly sweep away all the burnt gases which are replaced by fresh air, so as to have efficient explosion at the next stroke of the work piston. Obviously, the butterfly valve 74 can be regulated so as to admit the proper amount of air, depending on the type and amount of fuel delivered to the unit. The fuel will be automatically ignited by the glow plug 136 in a manner similar to a diesel engine. The glow plug, except when starting, need not be supplied with electricity, since it will be kept at a high-enough temperature to ignite the fuel discharged through the nozzle 134.

To stop the engine, the needle valve 124 is closed to stop fuel injection. Air fills the combustion chamber, then the rotary valve 84 is rotated to the position of FIG. 1, whereby the air is exhausted through the restricted passage 94 and fed into the reservoir 98, thereby building up air pressure in the reservoir 98. Of course, a safety valve will be provided to prevent over-pressure in the reservoir 98. The air pressure in this latter reservoir is held by check valves 102 and serves to start the engine by supplying compressed air to the proper set of outlets 112 and 114, or 116 and 118 by opening valve 108 or valve 110, depending on the position the rotor has reached when stopped. Fuel is then injected to operate the engine in normal manner. Check valves are adjustable to allow entrance into reservoir 98 of air at a higher pressure than the pressure of the burnt combustion gases when discharged from the work chamber.

When it is desired to provide continuous rotation of an output drive shaft, using the engine unit of the present invention, the arrangement shown in FIGS. 2 to 8 is preferred. Two engine units A just described are arranged with their output shafts 32 in axial alignment and oriented at 180 degrees apart, as shown in FIG. 2.

Figure 3:
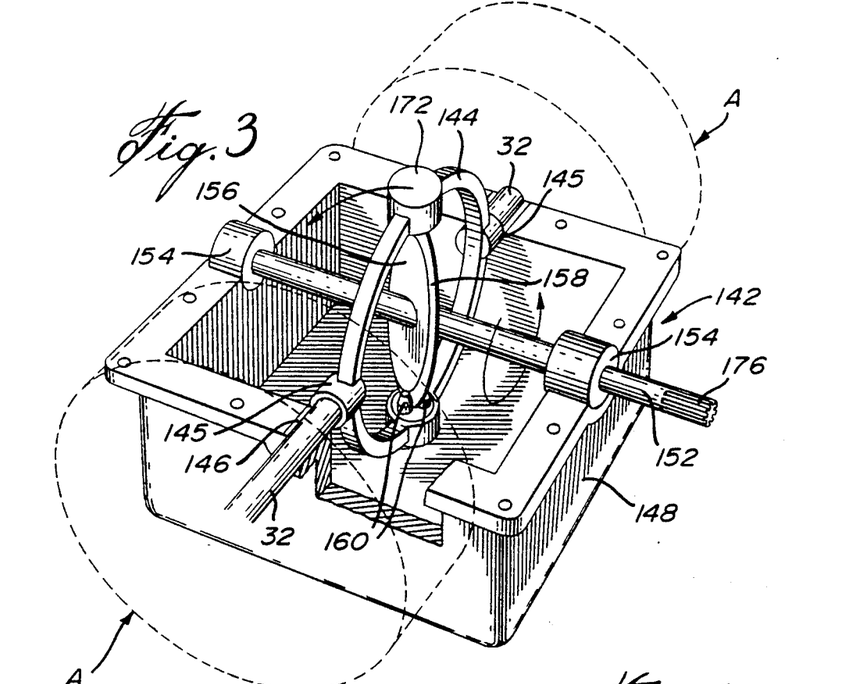
FIG. 3 is a perspective view of the motion-converting unit connected to the output shaft of of the engine units of FIG. 2, the latter being shown in dotted lines.
Figure 4:
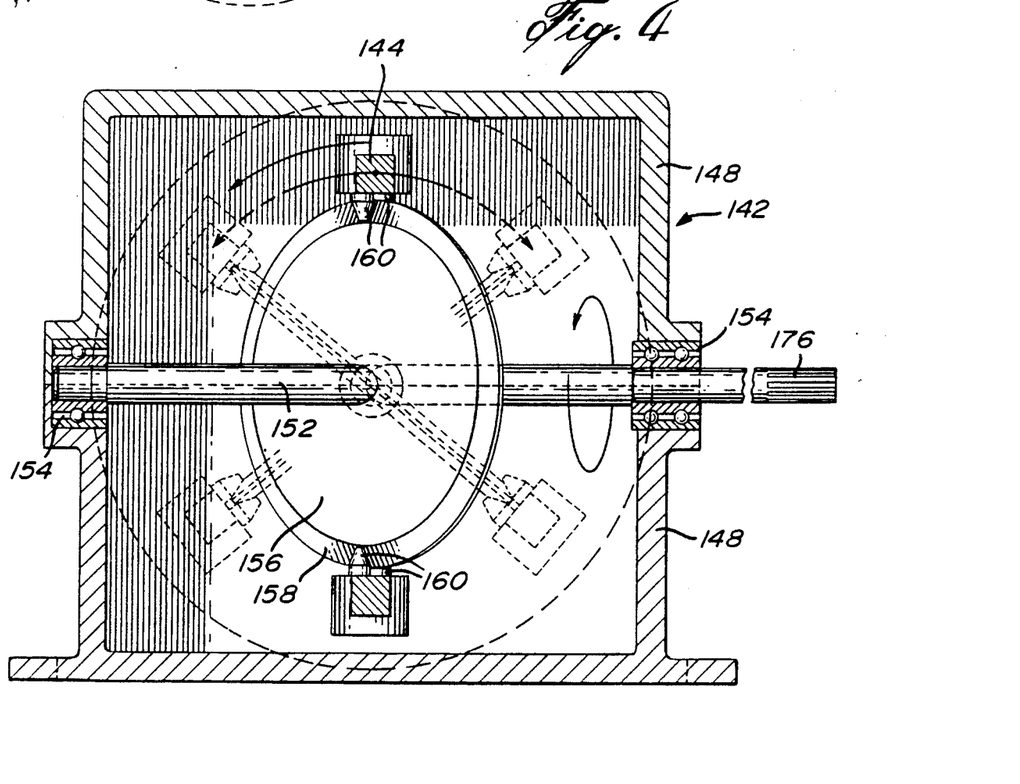
FIG. 4 is a vertical cross-section of the two assembled casing halves, in which the motion conversion unit is located and showing also said unit.
Figure 5:
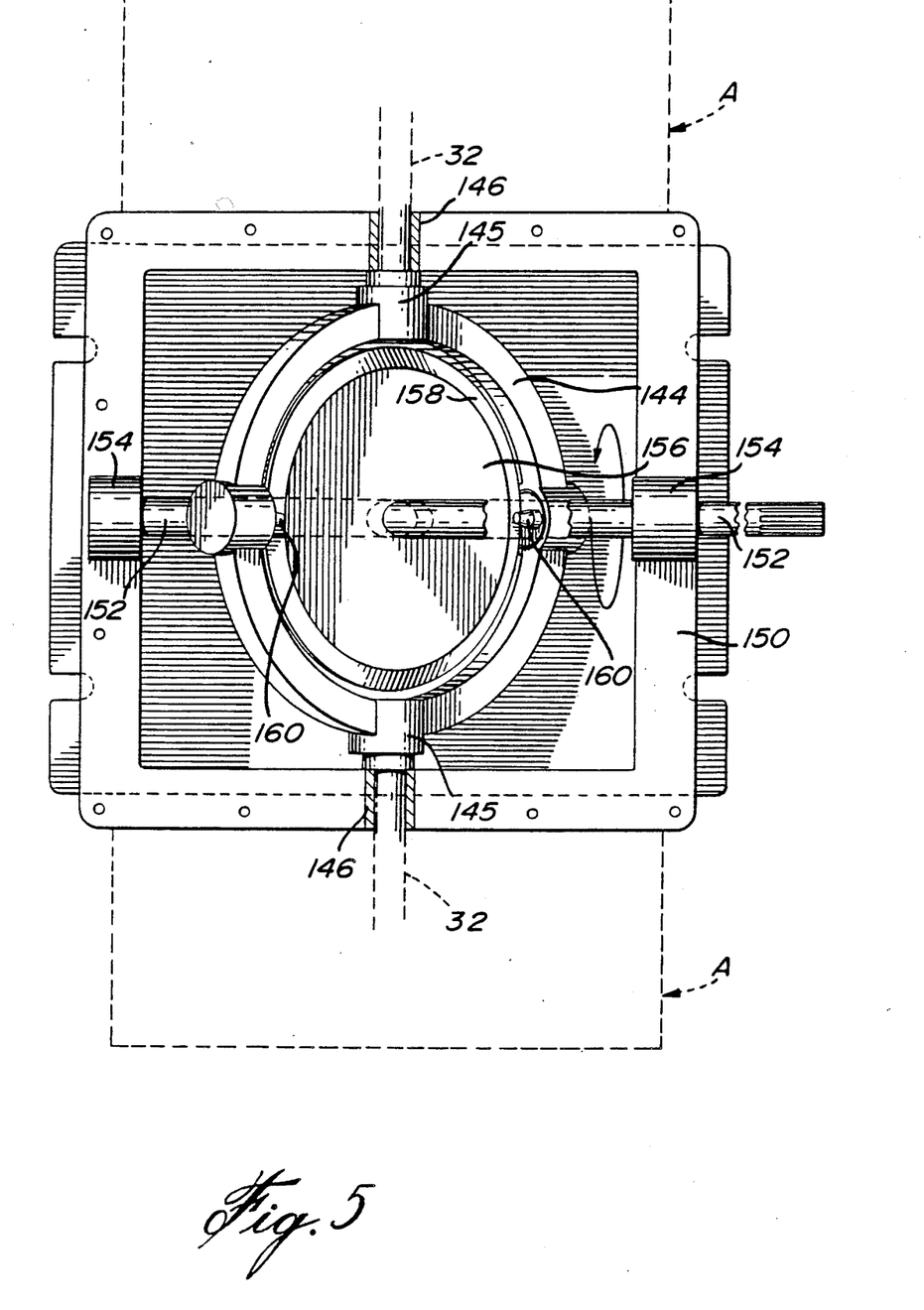
FIG. 5 is a plan view of one-half casing and of the conversion unit therein, the latter shown at another rotated position relative to that of FIG. 3.

The two output shafts 32 are connected to a motion-converting unit, generally shown at 142. This unit comprises a ring 144, two diametrically-opposed points of which are rigidly secured at 145 to the outer ends of the two output shafts 32. These shafts are mounted in bearings 146 formed in the flanges 150 of two housing halves 148, the latter adapted to be secured in fluid-tight relationship at their flange 150, so as to provide a housing adapted to contain the converting unit 142, which is immersed in oil.

Figures 6, 7, 8:
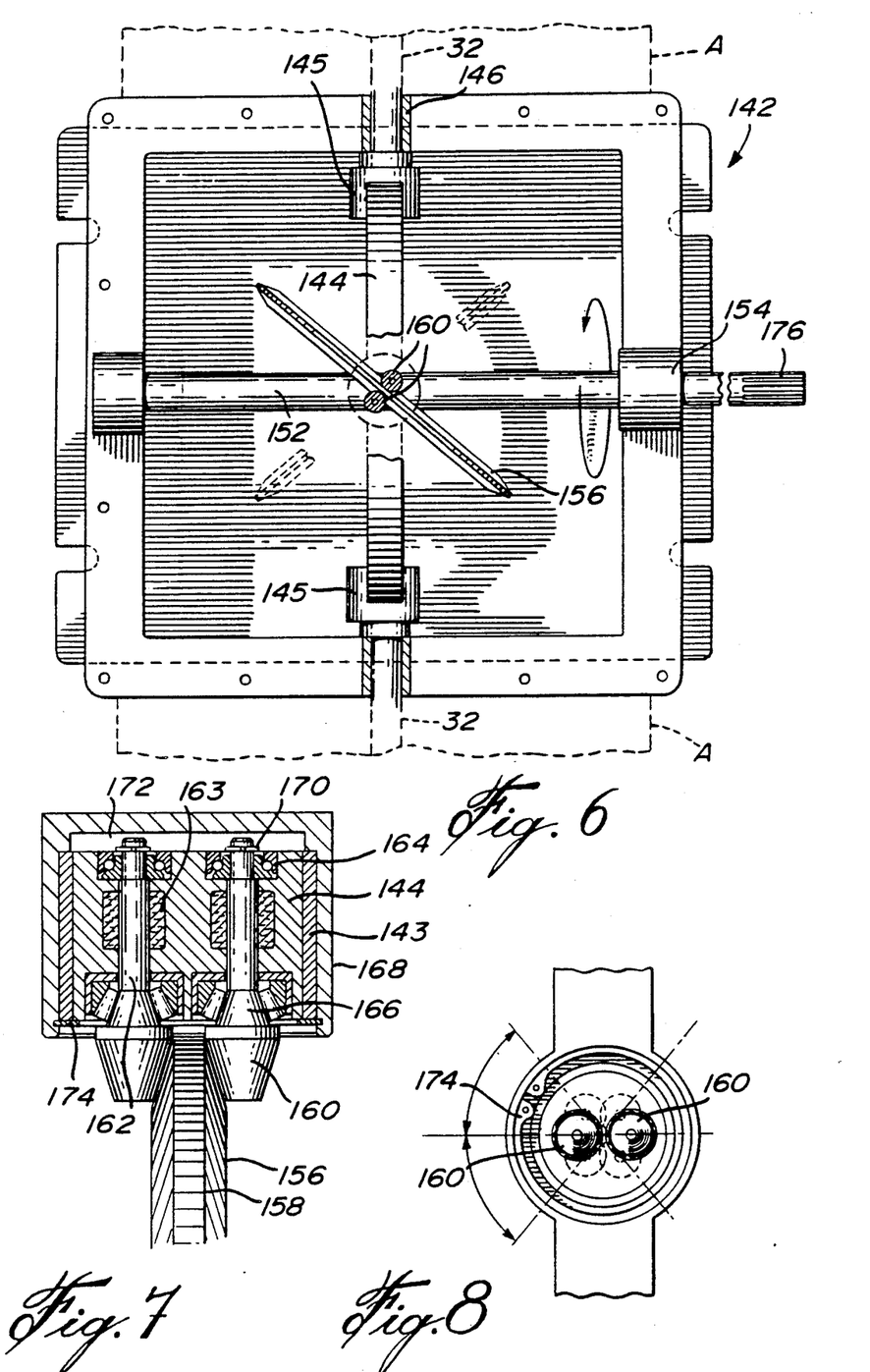
FIG. 6 is a view similar to that of FIG. 5 but showing the conversion unit in the rotated position of FIG. 3 and showing the ring broken away with the swash disc-contacting rollers in cross-section.
FIG. 7 is an enlarged view showing the ring in cross-section with the swash disc and the contacting rollers therefor.
FIG. 8 is an end view of the swash disc-contacting rollers.

A common drive shaft 152 extends through ring 144, intersects the axis of the two output shafts 32 and is normal to this axis. The drive shaft 152 is mounted in bearings 154 supported by the housing halves 148. A disc 156 is rigidly secured to the drive shaft 152 at the point of intersection of this drive shaft with the two output shafts 32. The disc 156 is inclined at about 45 degrees to the drive shaft 152 and is provided with a tapered marginal portion 158. Ring 144 carries two pairs of rollers 160, which have a conical shape, as shown in FIG. 7, and which engage the opposite tapered faces 158 of the inclined disc 156. The rollers 160 radially inwardly protrude from the ring 144 and the two pairs are mounted at diametrically-opposed points of the ring 144 and along an axis which is normal to the axis of the two output shafts 32. Each roller 160, as shown in FIG. 7, has a stem 162 which extends through a bore of a core block 143 and is mounted in ball bearings 164 and retained in core block 143 by end washers 170. The rollers have an inner tapered portion 166 mounted in thrust bearings 168. Each roller is thus freely rotatable relative to the core block 143. The latter is rotatable within an enlargement 172 of ring 144 and is retained in enlargement 172 by a split ring 174.

Each stem 162 is surrounded by a lubricating gland 163. Block 143 rotates in a bushing 145. As shown in FIG. 8, rotation of core block 143 in ring enlargement 172 enables rollers 160 to follow the variable inclination of disc 156.

The splined end 176 of the common drive shaft 132 can be connected to any rotary load.

It will be understood that the rollers 160 transmit all the torque exerted by the drive shafts 32 to the disc 156. Oscillating movement of the ring 144 through about 100 degrees, which is the oscillating stroke of the two engine units, will cause complete and continuous rotation of the drive shaft 152, the disc 156 acting like a swash plate.

Obviously, other types of motion-converting units may be used to convert the oscillating movement of the engine units to a continuous rotational movement. For instance one may use several engine units arranged in a circle and connected to a common output shaft by links and a crankshaft such as was found on air propeller engines with radial piston and cylinders. However, the conversion unit 142 just described, is believed to be a simple and efficient unit and is believed to be new per se.

The machine described in FIGS. 1 and 2 can also be used as a compressor with a simple modification, especially of the outlet ports.

Referring to FIGS. 9 to 12, there are shown additional embodiments of air admission systems.

Figure 9:
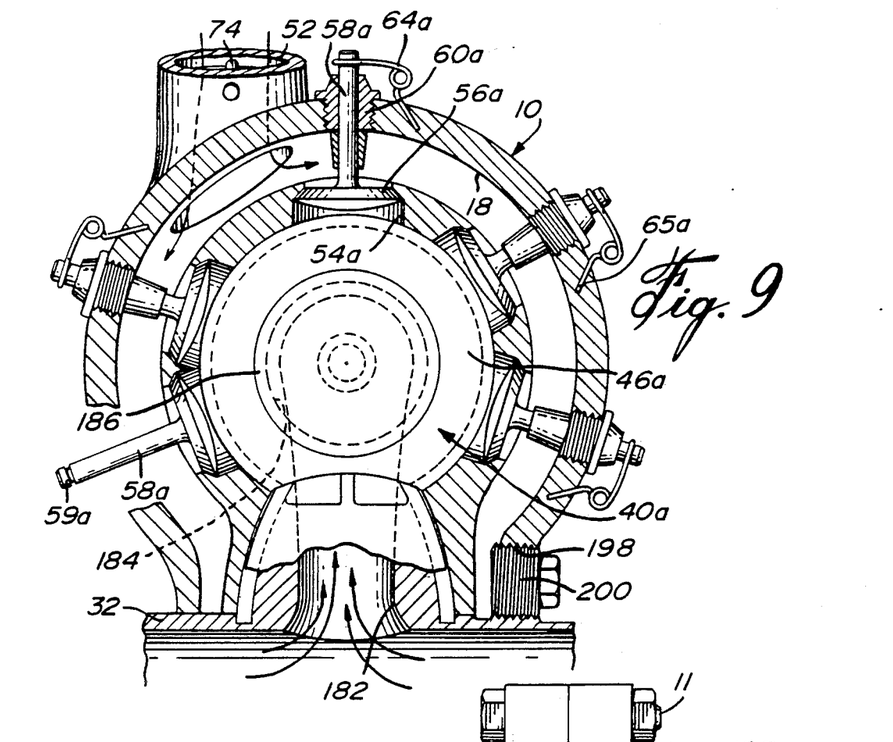
FIGS. 9 and 10 are partial longitudinal sections showing two additional embodiments of the compressor air inlet ports.
Figure 11:
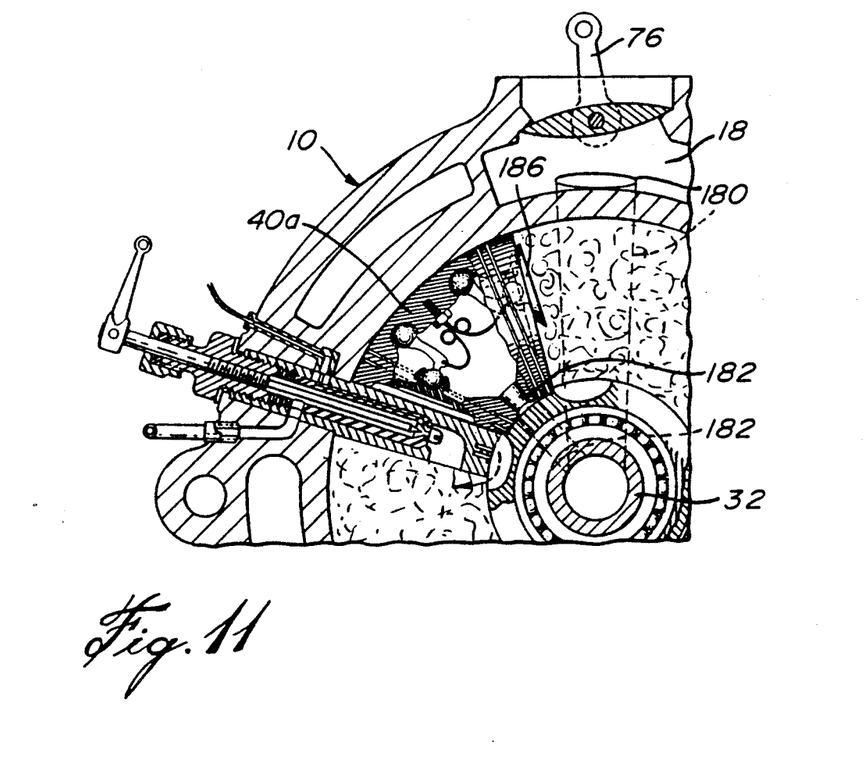
FIGS. 11 and 12 are cross-sections of part of the engine and of the compressor piston, respectively showing air inlet ports in the piston.
Figure 12:
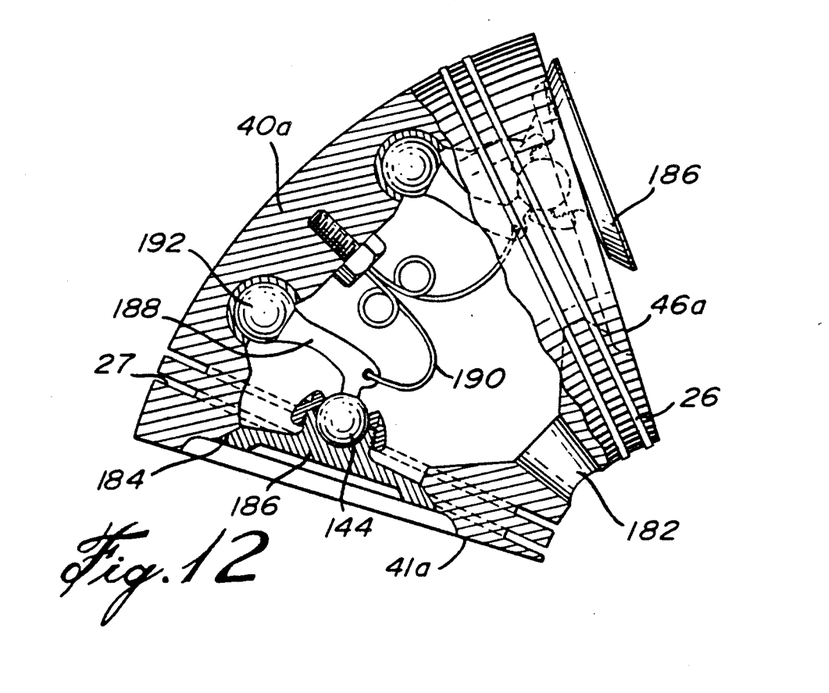

In FIG. 9 for better breathing, several air inlet ports 54a are located adjacent each partition 24, 25 and disposed in a circular arc in a plane substantially parallel to partitions 24, 25. A valve head 56a seats in port 54a under the bias of a hair pin spring 64a the bight of which fits into a groove 59a at the outer end of valve stem 58a and the two legs 65a of which are simply inserted into inclined blind bores made in casing 10. FIGS. 9, 11 and 12 show that air admission can be obtained completely or in combination with the ports 54a, by feeding air from chamber 18 into a duct 180 communicating with the inside of tubular output shaft 32 which communicates through a passage 182 with the interior of hollow compressor piston 40a which is provided with air inlet ports 184 at both faces 46a of piston 40a.

A valve 186 seats in each port 184 it is guided by an elbow lever 188 and is biased in seated position by a spring 190.

Lever 188 is pivoted to piston 40a at 192 and has a spherical joint 194 with valve 186.

Figure 10:
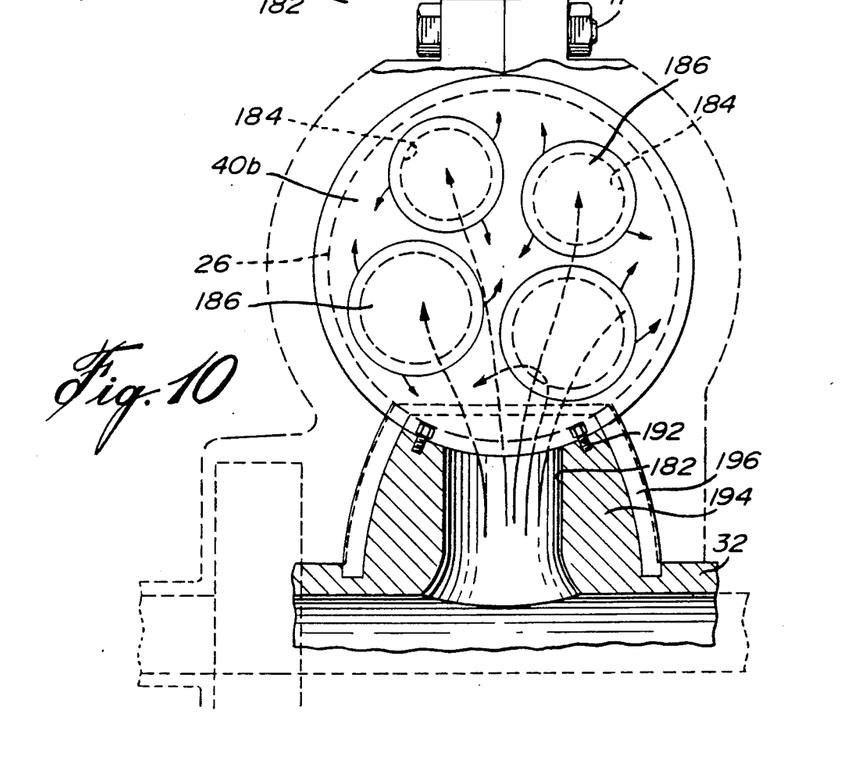

FIG. 10 shows several inlet ports 184 with associated valves 186 at the end faces 46b of compressor piston 40b.

This figure also shows that the air is completely fed through tubular shaft 32 and that air intake 52 has been eliminated while chamber 18 becomes a cooling chamber connected to chamber 16.

FIG. 10 and 12 also show that the sealing segments 26 are inserted in grooves 27 of piston 40a or 40b and are retained by bolts 192. FIG. 10 shows that piston 40b is fixed to a lateral boss 194 of shaft 32, this boss 194 having sealing segments 196.

FIG. 9 shows an orifice 198, normally closed by a screw plug 200, used to feed a starter fuel mixture when starting the engine at low temperature.

What I claim is:

1. A volumetric displacement machine comprising a casing defining a circular cavity, a rotor rotatably mounted in said casing, extending across and co-axial with said cavity, a pair of angularly-spaced radial partitions fixed to said casing, extending across said cavity and in sealing engagement with said rotor, said partitions defining in said cavity a compressor chamber and a work chamber, a compressor piston and a work piston fixed to and radially protruding from said rotor at angularly-spaced locations and extending across and in sweeping engagement with said compressor chamber and with said work chamber, respectively, said pistons oscillatable in their respective chambers between a left-hand and a right-hand dead position, valved air inlet ports in said casing opening into said compressor chamber, an outlet port in said casing opening into said work chamber intermediate said partitions, said rotor having an air transfer passage on each side of said compressor piston, each establishing communication between said compressor chamber and said work chamber around an adjacent partition when said compressor piston reaches a dead position at the last-named partition; wherein said casing has a double wall construction defining cooling chambers surrounding said work chamber and an air inlet chamber surrounding said compressor chamber, said air inlet chamber in communication with at least some of said inlet ports and with a central casing air inlet port, and further including a remotely-controlled butterfly vale mounted in said casing air inlet port for adjusting the amount of air entering said compressor chamber.

2. A machine as defined in claim 1, further including an exhaust pipe in communication with said outlet port, a remotely-operated rotary valve mounted in said pipe adjacent said outlet port, said rotary valve and said exhaust pipe of cylindrical shape, the rotary valve in rotational sliding contact with the pipe, the rotary valve having a through opening in its cylindrical wall which, in one rotated position of the rotary valve, registers with said outlet port to allow direct exhaust of the combustion gases from said work chamber into said exhaust pipe, said rotary valve further having a transfer passage at its external surface which is angularly spaced from said through opening and which, in another rotated position of said rotary valve, registers with said outlet port and also with a discharge passage of restricted cross-section made in said casing, so as to allow slower discharge of the combustion gases through said restricted discharge passage than when the combustion gases are discharged through said through opening of said rotary valve.

3. A machine as claimed in claim 1, wherein each piston having opposite radial faces making an angle with each other, the angle between the opposite radial faces of the work piston being larger than the angle between the opposite radial faces of the compressor piston, the compressor piston being centered relative to said work piston, the angular extent of said work chamber being greater than the angular extent of said compressor chamber; wherein in the dead positions of said pistons, one face of each piston is close to an adjacent partition; wherein said outlet port being closed by said power piston, except when the latter attains either one of its two dead positions; wherein the valves of said inlet ports being spring biased to closed position when said compressor chamber is at substantially atmospheric pressure and open against said spring bias when the air pressure of said compressor chamber has decreased down to a predetermined value below atmospheric pressure; wherein a valved air inlet port is located adjacent each partition and each inlet port valve includes a valve head, a stem to which said head is fixed, a lever pivoted to said stem and to said casing on the side of said head facing said compressor chamber, a guide plug screwed into said casing, having a central bore through which said stem extends and protrudes outwardly of said casing, the spring bias including a compression coil spring extending between said guide plug and a stop carried by the outer end of said stem, said spring located outwardly of said guide plug.

4. A volumetric displacement machine comprising a casing defining a circular cavity, a rotor rotatably mounted in said casing, extending across and co-axial with said cavity, a pair of angularly-spaced radial partitions fixed to said casing, extending across said cavity and in sealing engagement with said rotor, said partitions defining in said cavity a compressor chamber and a work chamber, a compressor piston and a work piston fixed to and radially protruding from said rotor at angularly-spaced locations and extending across and in sweeping engagement with said compressor chamber and with said work chamber, respectively, said pistons oscillatable in their respective chambers between a left-hand and a right-hand dead position, valved air inlet ports in said casing opening into said compressor chamber, an outlet port in said casing opening into said work chamber intermediate said partitions, said rotor having an air transfer passage on each side of said compressor piston, each establishing communication between said compressor chamber and said work chamber around an adjacent partition when said compressor piston reaches a dead position at the last-named partition; each piston having opposite radial faces making an angle with each other, the angle between the opposite radial faces of the work piston being larger than the angle between the opposite radial faces of the compressor piston, the compressor piston being centered relative to said work piston, the angular extent of said work chamber being greater than the angular extent of said compressor chamber; wherein in the dead positions of said pistons, one face of each piston is close to an adjacent partition; said outlet port is closed by said power piston, except when the latter attains either one of its two dead positions; the valves of said inlet ports are spring biased to closed position when said compressor chamber is at substantially atmospheric pressure and open against said spring bias when the air pressure of said compressor chamber has decreased down to a predetermined value below atmospheric pressure; further including a shaft to which said rotor is keyed, said shaft issuing form said casing, said compressor piston and said shaft being hollow, the interior of said compressor piston communicating with atmospheric air through said shaft, and wherein said valved air inlet ports are located at both radial faces of said compressor piston.

5. A volumetric displacement machine comprising a casing defining a circular cavity, a rotor rotatably mounted in said casing, extending across and co-axial with said cavity, a pair of angularly-spaced radial partitions fixed to said casing, extending across said cavity and in sealing engagement with said rotor, said partitions defining in said cavity a compressor chamber and a work chamber, a compressor piston and a work piston fixed to and radially protruding from said rotor at angularly-spaced locations and extending across and in sweeping engagement with said compressor chamber and with said work chamber, respectively, said pistons oscillatable in their respective chambers between a left-hand and a right-hand dead position, valved air inlet ports in said casing opening into said compressor chamber, an outlet port in said casing opening into said work chamber intermediate said partitions, said rotor having an air transfer passage on each side of said compressor piston, each establishing communication between said compressor chamber and said work chamber around an adjacent partition when said compressor piston reaches a dead position at the last-named partition; each piston having opposite radial faces making an angle with each other, the angle between the opposite radial faces of the work piston being larger than the angle between the opposite radial faces of the compressor piston, the compressor piston being centered relative to said work piston, the angular extent of said work chamber being greater than the angular extent of said compressor chamber; wherein in the dead positions of said pistons, one face of each piston is close to an adjacent partition; said outlet port is closed by said power piston, except when the latter attains either one of its two dead positions; the valves of said inlet ports are spring biased to closed position when said compressor chamber is at substantially atmospheric pressure and open against said spring bias when the air pressure of said compressor chamber has decreased down to a predetermined value below atmospheric pressure; further including a shaft to which said rotor is keyed, said shaft issuing from said casing, said compressor piston and said shaft being hollow, the interior of said compressor piston communicating with atmospheric air through said shaft, and wherein some of said valved air inlet ports are located at both radial faces of said compressor piston and wherein said compressor and work chambers have a toroidal shape and there are several valved air inlet ports located adjacent each partition and arranged in a partial circle in a plane substantially parallel to said partition and transverse to said compressor chamber.

* * * * *